United States Patent
Toledano

(10) Patent No.: US 8,401,535 B2
(45) Date of Patent: Mar. 19, 2013

(54) SYSTEM, A METHOD, AND AN APPARATUS FOR SHARING AN UPDATED CONTENT WITH PEERS

(75) Inventor: Eyal Toledano, Kiryat Ata (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1133 days.

(21) Appl. No.: 11/812,479

(22) Filed: Jun. 19, 2007

(65) Prior Publication Data
US 2008/0009272 A1 Jan. 10, 2008

Related U.S. Application Data

(60) Provisional application No. 60/814,586, filed on Jun. 19, 2006.

(51) Int. Cl.
*H04M 3/00* (2006.01)
(52) U.S. Cl. .......... 455/418; 455/412.1; 455/414.3; 455/550.1
(58) Field of Classification Search .......... 455/418, 455/412.1, 412.2, 414.2, 414.3, 422.1, 550.1, 455/410–411
See application file for complete search history.

(56) References Cited

U.S. PATENT DOCUMENTS

| 6,043,818 | A | 3/2000 | Nakano et al. |
| 6,208,342 | B1 | 3/2001 | Mugura et al. |
| 6,809,724 | B1 | 10/2004 | Shiraishi et al. |
| 2002/0068632 | A1 | 6/2002 | Dunlap |
| 2002/0107006 | A1* | 8/2002 | Nitta .............................. 455/414 |
| 2004/0078812 | A1 | 4/2004 | Calvert |
| 2004/0148434 | A1* | 7/2004 | Matsubara et al. ........... 709/246 |
| 2005/0037708 | A1* | 2/2005 | Torvinen ...................... 455/41.2 |
| 2005/0043060 | A1 | 2/2005 | Brandenberg et al. |
| 2005/0064852 | A1* | 3/2005 | Baldursson ................ 455/414.2 |
| 2006/0265427 | A1* | 11/2006 | Cohen et al. .................. 707/200 |
| 2007/0130360 | A1* | 6/2007 | Li ................................. 709/231 |
| 2007/0140200 | A1* | 6/2007 | Kirbas et al. .................. 370/338 |
| 2007/0224977 | A1* | 9/2007 | Yamaguchi et al. ....... 455/414.2 |
| 2007/0294250 | A1 | 12/2007 | Linder et al. |

OTHER PUBLICATIONS

Castelluccia "A Hierarchial Mobile IPv6 Proposal", INRIA, No. 0226, 1998.
Gronbaek "Cellluar and Mobile IP: Overview and Enhancements", Project I Paper, 1999.
Perkins "IP Mobility Support", Network Working Group, 2002.
Perkins "Mobile IP", IEEE Communications Magazine, p. 84-99, 1997.
Perkins et al. "Route Optimization in Mobile IP draft-ietf-Mobileip-Optim-09.txt", KMobile IP Working Group, 2000.
Perkins et al. "Optimized Smooth Handoffs in Mobile IP", The Fourth IEEE Symposium on Computers and Communications, p. 340, 1999. Abstract only.
Official Action Dated Sep. 14, 2010 From the US Patent and Trademark Office Re. U.S. Appl. No. 11/812,480.

* cited by examiner

*Primary Examiner* — Marcos Torres

(57) ABSTRACT

A method for providing content via a wireless communication network to a requesting terminal. The method comprising editing the content on a mobile terminal, receiving a request at a mobile terminal for the content from the first requesting terminal, and providing the content to the first requesting terminal via at least one connection with a mobile terminal storing the content.

25 Claims, 8 Drawing Sheets

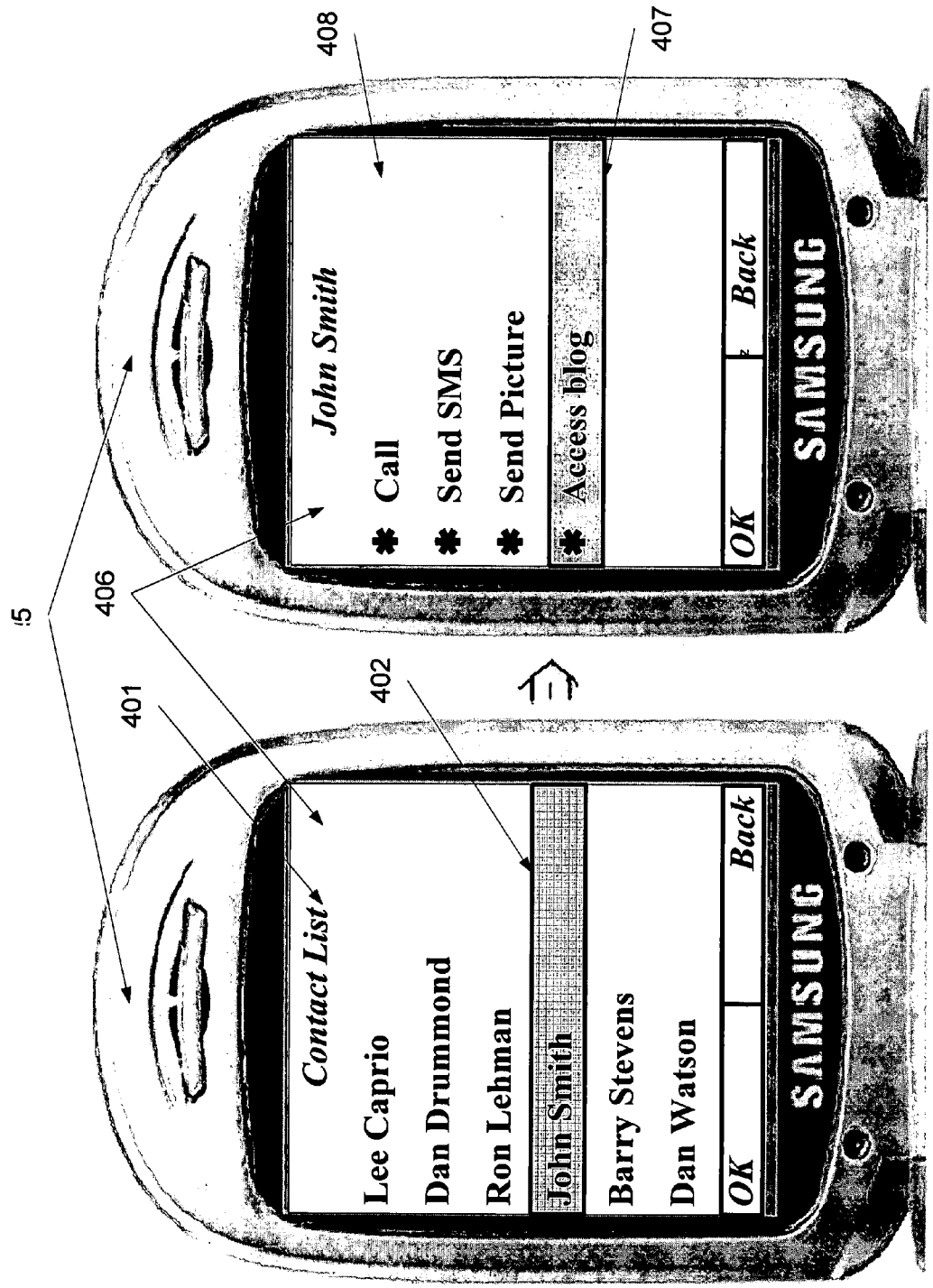

SYSTEM, A METHOD, AND AN APPARATUS FOR SHARING AN UPDATED CONTENT WITH PEERS

The present application claims the benefit of U.S. Provisional U.S. Patent Application No. 60/814,586 filed on Jun. 19, 2006, the content of which is hereby incorporated by reference.

FIELD AND BACKGROUND OF THE INVENTION

The present invention relates to an apparatus and a method for sharing information with peers over a wireless communication network and, more particularly, but not exclusively to an apparatus and a method for sharing information with peers over a wireless communication network in peer-to-peer connections.

A web log (Blog) is defined, inter alia, as a frequent, chronological publication of personal thoughts and Web links. A Blog often contains information about what is occurring in a person's life, in a certain area of specialty, such as sport, law, and medicine, what is occurring over the Internet, or any combination thereof. Blogs that contain information about what is occurring in a person's life are used as a living journal, an online chronicle of personal, creative and organizational life. During the last years, Blogs have grown in number, content, and audience. It is believed that the very growth in the usage of Blogs indicates that they respond to a significant user demand. Internet users are increasingly visiting Blogs for the freshest and fastest moving content over the Internet and for the most insightful expert commentary on topics they are interested in.

Bloggers often have a strong desire to express themselves in many different ways on the web. Mobile communication devices provide a new method to publish and update Blogs easily. Blogs that consists of content posted to the Internet from a mobile or portable device, such as a cellular phone or personal digital assistant (PDA), are known, inter alia, as mobile Blogs (MoBlogs). A MoBlog technology allows a user to use her mobile device to post and to update content that is stored in a hosting server that is connected to the Internet.

For example, U.S. Patent Application Publication No. 2006/0019699, issued on Jan. 26, 2006 discloses a method for uploading a web Blog in a mobile communication terminal and system thereof are disclosed, in which the web Blog is composed and stored by off-line using the mobile communication terminal, in which the web Blog is transmitted via a wireless connection to a computer, and by which the users web Blog can be uploaded to a web Blog site. By selecting the upload of the web Blog automatically or manually and by notifying a presence or non-presence of the upload completion to the user, the present invention facilitates the web Blog to be uploaded within wireless Internet access, thereby enhancing convenience of using the mobile communication terminal.

One of the features that contribute to the popularity of MoBlogs is the ability to be updated easily and promptly with new information, which is related to the Blogger or to her area of interest. For example, U.S. Patent Application Publication No. 2005/0075097, issued on Apr. 7, 2005 discloses a mobile terminal that includes a memory storing application software and data that is descriptive of the use of the mobile terminal, a display, and a controller that is coupled to the memory. The controller is responsive to the application software and to one or more sub-sets of the stored data for visualizing on the display, in a graphical form, the use of the mobile station over a period. The controller preferably constructs a temporally based visualization of the use of the mobile station, such as a timeline visualization of the use of the mobile station. The controller may further be responsive to the application software and to at least the sub-set of the stored data for automatically deriving a content of a user's (Blog). A method is also disclosed to operate a mobile terminal having a memory storing application software and data that is descriptive of the use of the mobile terminal. The mobile terminal has a display and a controller coupled to the memory. The method includes selecting at least a portion of the data and constructing a Blog that is indicative of the use of the mobile station over a period, as indicated by the selected portion of the data. The Blog may include an animation that is indicative of the use of the mobile station over the period, and may include textual data that is generated automatically in accordance with the use of the mobile station over the period.

Though the aforementioned systems and devices allow the uploading of new information to Blogs, which are hosted in Internet-based servers, there is a need for solutions that can provide new advanced capabilities for Bloggers and mobile users.

SUMMARY OF THE INVENTION

The present embodiments comprise an apparatus and a method for sharing information with peers over a wireless communication network in peer-to-peer connections. One embodiment of the present invention discloses a method for providing a shared updated journal, such as a mobile Blog, via a wireless communication network, such as a cellular network, to a requesting terminal, such as a mobile terminal or a fixed terminal. The method comprises editing the shared updated journal using a mobile hosting terminal, such as a cellular phone, receiving a request for the shared updated journal from the requesting terminal, and providing the shared updated journal to the requesting terminal. The shared updated journal is provided via one or more peer-to-peer connections, which are established between the requesting terminal and one or more mobile hosting terminals. In such an embodiment, less bandwidth and computational complexity are needed from the mobile hosting terminal in order to provide a related Blog to a requesting terminal.

Another embodiment of the present invention discloses a mobile terminal, such as a cellular phone, that comprises a repository that stores shared updated journal, such as a Blog or a photo album. The shared updated journal in the repository may be updated, constantly or occasionally, by the user of the mobile hosting terminal or by updating modules that monitor a sensor or an activity, as further described below. The mobile terminal further comprises a wireless communication receiver for receiving a request for the shared updated journal from a requesting terminal, such as a mobile or a fixed terminal, and a wireless communication transmitter for transmitting the segments to the requesting terminal over a wireless communication network to the requesting terminal. Optionally, the segments are transmitted over a peer-to-peer connection.

According to one aspect of the present invention there is provided a mobile hosting terminal, such as a cellular phone, with a repository that stores a number of location indicators, such as pointers, to a plurality of segments of a distributed content. Optionally, the segments are stored on a different mobile hosting terminal. Optionally, some or all the segments are stored in a fixed hosting terminal, such as a server. Optionally, the location indicators are stored in a pointer file, such as a torrent file. The mobile hosting terminal further comprises a wireless communication receiver that receives requests for the distributed content from a requesting terminal and a wireless communication transmitter for providing the location indicators to the requesting terminal, thereby allowing it to acquire the segments via peer-to-peer connections, as further described below.

According to one aspect of the present invention there is provided a method for acquiring media content information via a peer-to-peer connection that is established over a wireless communication network. The method comprises designating a member of a plurality of user identifiers (IDs), such as a contact of a address book or a contact list of a cellular phone. The number is used for establishing a call with a respective user. For example, a user may designate a contact from the address book of her phone. Then, a request for receiving the media content information is sent to the designated contact. Such an embodiment allows peers to acquire the media content information from or using the mobile terminal of the designated contact member, optionally via the communication connection, such as a peer-to-peer connection.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 5 and 6 are exemplary schematic illustrations of a screen of the requesting terminal, according to one embodiment of the present invention;

DESCRIPTION OF THE PREFERRED EMBODIMENTS

Figure 1:
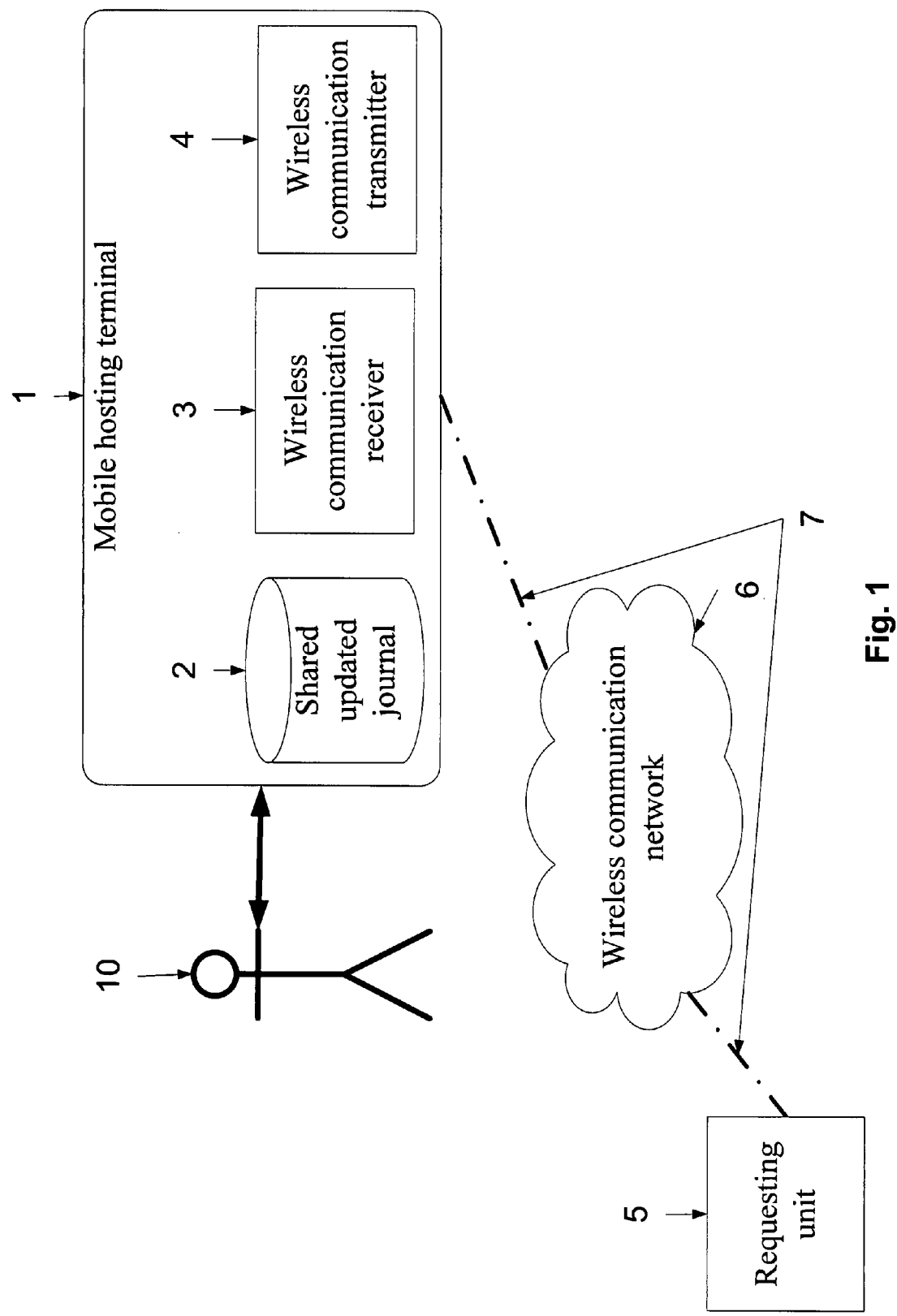
FIG. 1 is a schematic illustration of a peer-to-peer (P2P) connection that is established between a mobile hosting terminal and a requesting terminal, according to one embodiment of the present invention.

The principles and operation of apparatuses and methods according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

A mobile terminal may be understood as a cellular phone, a dual-mode phone, a PDA that is capable of wirelessly transferring information over cellular networks or any other system or facility that is capable of wirelessly and directly transferring information over cellular networks.

Reference is now made to FIG. 1, which is a schematic illustration of a peer-to-peer (P2P) connection 7 that is established between a mobile hosting terminal 1 and a requesting terminal 5, according to one embodiment of the present invention. The P2P connection 7 is established over a wireless communication network 6, such a cellular network or a wireless computer network, such as wireless local area network (WLAN) that transmits and receives data in coded in packets using modulated electromagnetic waves.

The mobile hosting terminal 1 comprises a repository 2 that stores shared updated journal or one or more segments thereof, as described below. The repository 2 may be implemented one or more memory devices, such as a non-volatile memory (NVM) or dynamic random access memory (DRAM). The mobile hosting terminal 1 further comprises a wireless communication receiver 3 that is designed to receive a request for the shared updated journal, such as a URL call or a web browser's request for an a hypertext markup language (HTML) document.

It should be noted that shared updated journal may be understood as a website such as a Blog or a webspace, a link to a website such as a Blog or a webspace, a digital photo album, a set of video sequences, or any other user defined multimedia content, such as audio, video, and text, which is preferably periodically updated. In addition, it should be noted that the idiom shared updated journal is used as an exemplary form of content. Other types of content, such as media content, multimedia content, sets of photos, sets of videos, or any combination thereof may be used in a respective manner in the embodiments of the present invention.

Figure 2:
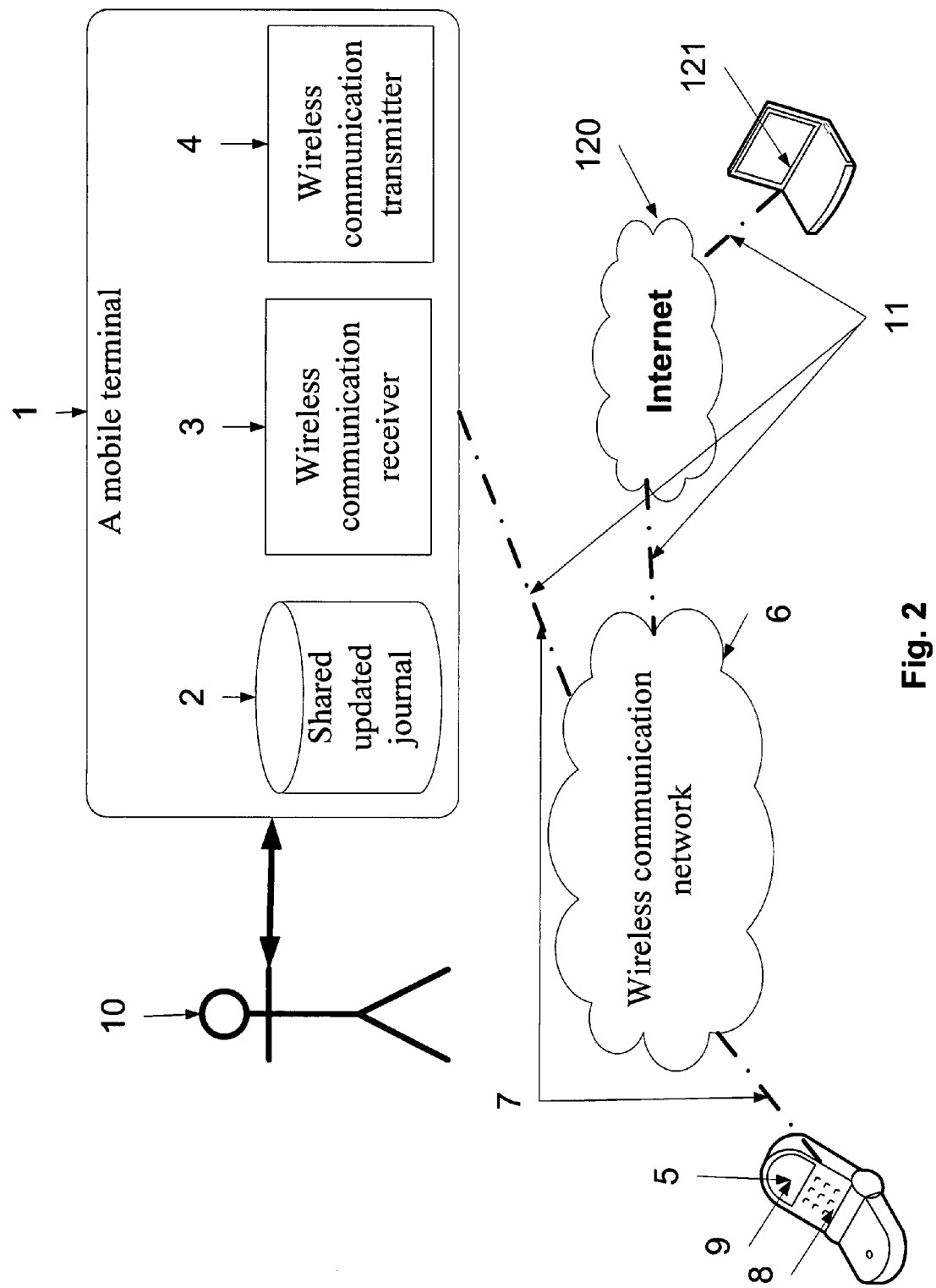
FIG. 2 is a schematic illustration of a P2P connection, according to FIG. 1 and another P2P connection that is established between the mobile hosting terminal and a fixed requesting terminal, according to one embodiment of the present invention.

Reference is now made to FIG. 2, which is a schematic illustration of a peer-to-peer (P2P) connection 7, as depicted in FIG. 1, and an additional P2P connection 11, according to one embodiment of the present invention. In FIG. 2, the requesting terminal 5 is a cellular phone and the wireless communication network 6 is connected to the Internet 120. A network node, such as a personal computer 121 is connected to the Internet 120. Optionally, the request is originated from a mobile requesting terminal, such as a cellular phone, as shown at 5. In such an embodiment, the P2P connection 7 may be established only via one or more cellular networks. Optionally, the request is originated from a fixed requesting terminal, such as the network node 121. In such an embodiment, the P2P connection 11 is established over the wireless communication network 6 and the Internet 120. In such an embodiment, the request is originated from the network node 121. The mobile hosting terminal 1 comprises a wireless communication transmitter that transmits the shared updated journal or a number of segments thereof to the requesting terminal 5, 121 via the respective P2P connection 7, 11. Optionally, the mobile hosting terminal 1 is a cellular phone. In such an embodiment, the wireless communication receiver and transmitter 3, 4 are part of the integral cellular transceiver of the hosting cellular phone. Optionally, the wireless communication receiver and transmitter 3, 4 are parts of a server module that may function as a network mode.

Optionally, both the hosting and the requesting terminals 1, 5 include a user interface (UI) that includes a user input device, such as a keypad, optionally as shown at 8, a navigation device, such as a track-ball mouse, and a display device, such as a screen, for example as shown at 9.

The mobile hosting terminal 1 includes a controller that comprises a microprocessor or microcontroller and a digital signal processor (DSP) device. The controller is coupled over a bus to the repository 2 that stores the shared updated journal. Optionally, the shared updated journal includes a mobile Blog that is managed by a user 10 of the mobile hosting terminal 1, optionally using the UI, as described below.

The mobile hosting terminal 1 provides the user 10 with the ability to create the shared updated journal and optionally to store it locally in the repository 2. For example, the user 10 may create one or more personal mobile Blogs or sites that may be accessed via one or more P2P connections, as shown at 7 and at 11. Each personal mobile Blog may contain a documentary of events, which are related to the personal interests of the user 10, such as his autobiography, sport, politic, social network, animals etc.

The shared updated journal is designed to be browsed by a mobile browser program, such as Opera™ mobile browser.

As further described below, the user may use the mobile hosting terminal 1 to create and to store a personal mobile Blog in a manner that allows one or more peers to browse it via the wireless communication network 6. For example, a user, as shown at 10, which is interested in sports, may create and store a mobile Blog that includes shared information such as sport results that she is monitoring, pictures and video clips from sport event, ideas, estimations, etc. As further described below, the mobile Blog may be updated by the user 10 using the mobile hosting terminal 1 whenever the user 10 wishes to do so. Optionally, a peer that is interested in sports may have permission to access the mobile web log created by the user 10. In another example, a user, as shown at 10, that is interested in politics may create and store a mobile Blog that includes shared information, such as daily news records and political commentary on the day's events. Occasionally, the user 10 may add pictures or notes that explain her political view. As the mobile Blog is hosted in the repository 2 of the mobile hosting terminal 1, the user may update or edit it without having to upload information to an external server. In such a manner, peers that access the mobile Blog, as described above, have access to the most up-to-date version of the mobile Blog. Optionally, the user 10 may create and store a number of different Blogs, each having a different address that is optionally associated with a different port.

Reference is now made, once again, to FIG. 1. The terminals 1, 5 may be understood as network nodes. The mobile hosting terminal 1 functions as a server and the requesting terminal 5 functions as a client. Optionally, the mobile hosting terminal 1 also may be used for accessing or downloading shared updated journal from a terminal, such as the requesting terminal 5. In such an embodiment, the wireless communication network 6 allows the establishment of a network of nodes, wherein each node functions as a server and as a client.

As further depicted in FIGS. 1 and 2, the mobile hosting terminal 1 may be connected in a P2P connection 7 to the one or more requesting terminals 5. Although only one mobile requesting terminal 5 and only one fixed requesting terminal 5 are depicted, a large number of requesting terminals 5, 121 may similarly be connected to the mobile hosting terminal 1. The P2P connection 7 allows the respective requesting terminal 5 to access the shared updated journal. In such a manner, the user 10 may share a Blog with one or more group of friends, peers, and Bloggers, as further described below.

Figure 3:
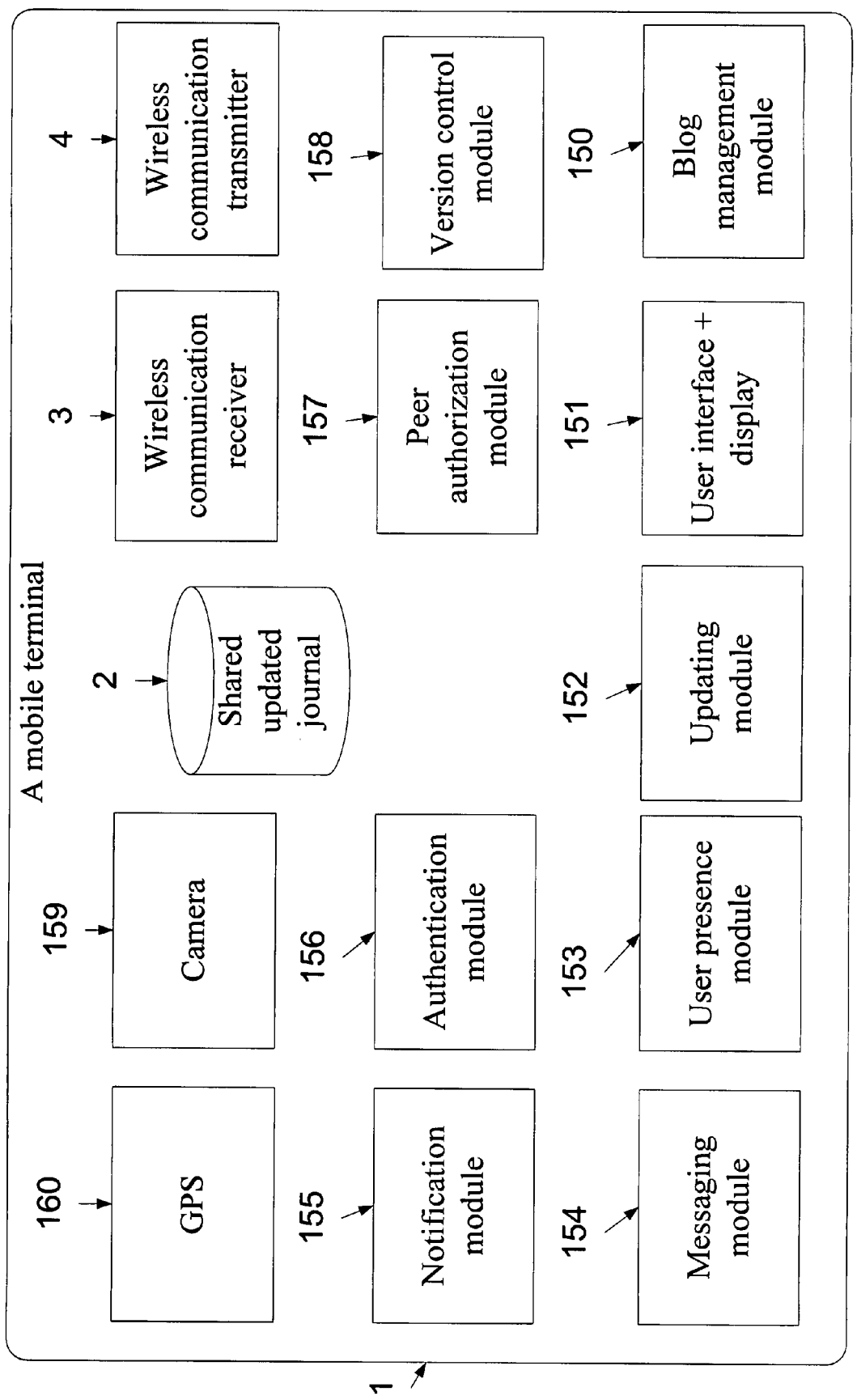
FIG. 3 is a schematic illustration of the mobile hosting terminal of FIG. 1, according to one embodiment of the present invention.

Reference is now made jointly to FIG. 1 and to FIG. 3, which is a schematic illustration of the mobile hosting terminal 1 of FIG. 1, according to one embodiment of the present invention. The mobile hosting terminal 1 comprises the repository 2 and the wireless communication receiver and transmitter 3, 4 which are depicted in FIG. 1, however the mobile terminal further comprising a number of additional modules 150-160 that extend the services and capabilities which are provided by the mobile hosting terminal 1.

Optionally, the mobile hosting terminal 1 hosts a Blog management module 150 that allows the user to document, either manually or automatically, day's events and user generated content. The Blog management module 150 allows the user to store content files of various kinds that have been acquired by the user from various sources or self generated on the device referenced by some multi media content representation. The content is represented organized and referenced in a transport object model such as a hypertext page or similar multi-media representation, such as flash scalable vector graphics (SVG), SVG, extensible markup language (xml), really simple syndication (RSS) feed etc.

As described above, the shared updated journal may comprise one or more mobile Blogs, which are hosted in the repository 2. The Blog management module 150 allows the user to edit the mobile Blogs using the aforementioned UI and display 151. Optionally, the Blog management module 150 provides one or more Blog templates.

In use, the user creates the pages of the mobile Blog using HTML authoring tool or equivalent tool for other formats. Subjects, dates or both may define the order the pages. Optionally, each page is newly created in a stand-alone mode.

The user may select a different template for each page or use different application settings. Optionally, a single template is used for a number of pages.

Each Blog template has a number of dynamic or static rubrics for different types of content. The static rubrics are defined by the user and remain unchanged until she updates them. For example, each Blog template comprises static rubrics such as my profile rubric that allows the user 10 to provide a short description about her, my pet rubric that allows the user 10 provide a short description of her pet, my favorite co-MoBloggers that allows the user 10 provide a list of favorite MoBlogs, etc.

The dynamic rubrics, on the other hand, are updated automatically according to hardware and software modules of the mobile hosting terminal 1. For example, a dynamic rubric may be updated according to a variety of data sources, which are local to the mobile hosting terminal 1, including, but not limited to, phone call logs, short message service (SMS) logs, calendar applications, and personal information.

Optionally, the dynamic rubrics are updated according to the outputs of a sensor, such as an image sensor, a microphone, and a global positioning system (GPS) 160. For example, the shared updated journal may comprise a dynamic rubric that stored recordings of a voice recorder, which is preferably an integral voice recorder of the mobile hosting terminal 1. In such an example, the user 10 may share his recordings with peers that access the shared updated journal.

Optionally, one or more of the dynamic rubrics are updated according to the schedule of the user 10. Such dynamic rubrics may be updated according to the phone scheduler or the personal information management system (PIMS) of the hosting mobile terminal 1. Optionally, the Blog management module 150 allows the user to associate between events, such as dates, times, and appointments and multimedia files. In such a manner, when a certain event occurs, the dynamic rubric is updated according to the associated multimedia file.

For example, if the user has a recurred event on Monday evening, such as a painting class that is associated with an image of the teacher, the dynamic rubric is updated on Monday evening according to the image of the teacher.

Figure 4:
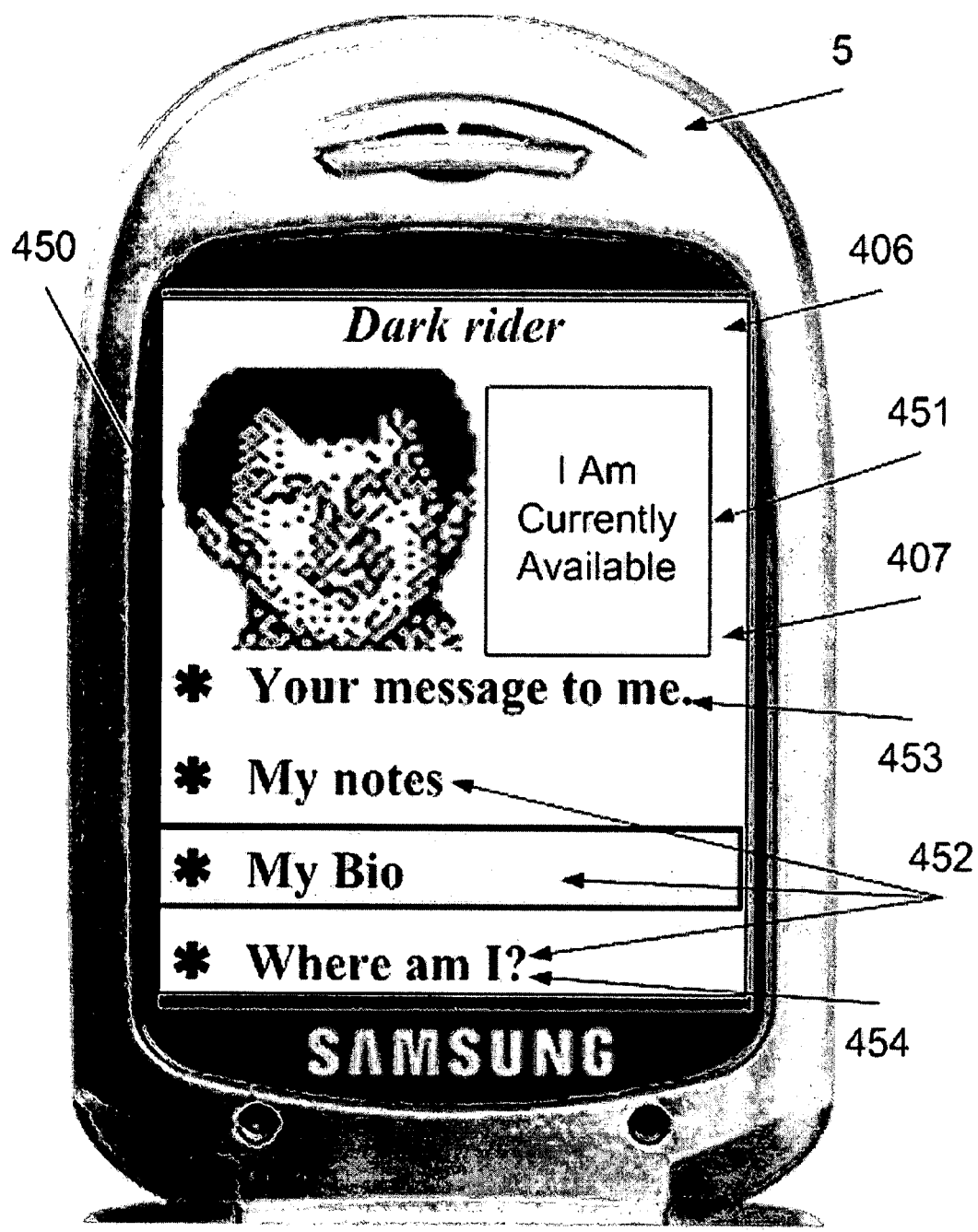
FIG. 4 is a schematic illustration of a screen of a mobile terminal that displays a Blog of a certain user, according to one embodiment of the present invention.

Reference is now made to jointly to FIG. 3 and FIG. 4, which is a schematic illustration of a screen of a mobile terminal 5 that displays a Blog 407 of a certain user, according to one embodiment of the present invention. The displayed Blog includes an image 450, preferably of the Blogger, a presence indicator rubric 451 and a number of links 452 to different webpages or rubrics, which are hosted in the repository 2.

Optionally, the mobile hosting terminal 1 hosts a user presence module 153 that updates a dynamic rubric, such as the presence indicator rubric 451, with the availability status of the user 10. The user presence module 153 automatically identifies the current availability status of the user 10 according to predefined behavioral patterns and updates the presence indicator rubric 451 that changes the text or the graphics thereof accordingly. For example, when the user uses her mobile terminal 1 for participating in a call, such as a cellular call or a VoIP call, or for writing or reading an electronic message, such as an SMS or instant messaging (IM), the user presence module 153 updates the presence indicator rubric 451 to indicate that the user is busy. In another example, the user presence module 153 identifies the operational mode of the mobile hosting terminal 1, such as silence mode, a meeting mode, a pager mode, or an outdoor mode, and changes the presence indicator rubric 451 accordingly.

Optionally, the mobile hosting terminal 1 comprises an internal or external image sensor, such as a camera 159. In such an embodiment, one or more of the Blog templates may comprise a daily photograph rubric that displays one or more of the pictures taken using the camera 159, optionally during a predefined period, such as the last 24 hours. The images are stored in the memory of the mobile hosting terminal 1.

Optionally, the mobile hosting terminal 1 is connected to an internal or external GPS 160. The GPS outputs coordinates of the current location of the mobile hosting terminal 1 in real time. Optionally, the mobile hosting terminal 1 stores a set of predefined coordinates. Each set of predefined coordinates is associated with a different picture, graphic or text. In such an embodiment, one or more of the Blog templates may comprise a location-based rubric 454 that displays one or more of the pictures, graphics or text that describe the location of the user. For example, an exemplary user 10, which is a student, may associate, optionally using the Blog management module 150, the coordinates of her university with a message, such as "I'm at school learning—Please send SMS", her latest image in the campus, a video clip of her and her friends in school, or any combination thereof. In use, the whenever the user is in the campus, the message, the image, the video, or any combination thereof are set to be visible to the accessing peers. The same mechanism may set for making posting visible all the time but invisible at a location specific.

Optionally, a central server may automatically update the location-based rubric 454. In such an embodiment, the outputs of the GPS 160 are forwarded to a central server that stores multimedia files, which are associated with predefined location records. The sent outputs are matched with one of the predefined location records and the associated multimedia file or a link thereto is stored in the location-based rubric 454. Optionally, the central server sends a .torrent file of the matched multimedia file to the mobile hosting terminal 1.

In such an embodiment, the Blog management module 150 may store a set of location parameters, each associated with a representative text or image.

The same location-based rubric may be automatically updated using radiolocation and trilateration methods, which are based on the signal-strength of the closest cell-phone towers. The shared updated journal may contain images, video, voice recordings, user created ring-tones, internet links, text, etc. The Blog management module 150 may be used to arrange the shared updated journal and handle their accessibility to peers.

Optionally, the mobile hosting terminal 1 hosts a messaging module 154 that allows a peer who access the Blog 405, as described above, to post her a comment, a message, or a remark or to upload content such as a file, a video, an audio, a document, etc. Preferably, the posted comment, message, or remark, the uploaded content, or both are stored in the repository 2. In such an embodiment, the accessing peers may communicate with the user of the mobile hosting terminal 1 by leaving him messages or content without calling him or sending him an SMS.

Optionally, the peer who accesses the Blog 405 posts a message using an interface, such as a common gateway interface (CGI) form that allows the peer to edit and to upload his posting, or using an SMS or a multimedia messaging service (MMS) that may be formatted or free text or an MMS sent to the blog owner or host. CGI forms are well known and utilize the HTML tags. The SMS and MMS may be formatted as a CGI form and the new content may be added as a new port to the mobile blog. Optionally, the peer may send an MMS that contains multimedia files that may be added to the post using a mechanism such as a torrent mechanism.

Optionally, the mobile hosting terminal 1 hosts a notification module 155 that notifies the user of the mobile hosting terminal 1, any subscriber of the Blog 405, or both when the shared updated journal is changed. In such an embodiment, the user may be alarmed or notified by an internal message, a sign, or a signal when one or more sections of the Blog 405, as described above, has been changed or updated.

Optionally, the notification module 155 generates a web feed, such as an RSS message that contains either a summary of the changed content or an update notification. The RSS makes it possible for peers to keep up with the updated journal in an automated manner.

Optionally, the notification module 155 generates an electric message, such as an SMS or an email that contains a summary of the changed content, an update notification, or both. The electric message is sent, preferably via the wireless communication network 6, to a chosen group of peers, such as subscribers of the mobile Blog or contact of the address book of the mobile hosting terminal 1.

Optionally, the notification module 155 generates an internal alarm that notifies the user that a message or a multimedia content file has been changed or stored in the repository 2, optionally using the messaging module 154.

Optionally, the notification module 155 generates a peer attendance list that is updated in real time and indicates who are the peers that currently access the shared updated journal. The list is optionally displayed in a dynamic rubric of the mobile Blog, as described above.

Optionally, the IDs of the peers, which access the mobile Blog, as described above, are hidden. In such an embodiment, the notification module 155 may generate an alarm that notifies how many people are connected to the Blog at any given moment.

Optionally, the mobile hosting terminal 1 hosts an authentication module 156 for identifying the access privileges of peers who access the shared updated journal, as described above. Optionally, the authentication module 156 allows a peer to access one or more sections of the Blog 405 according to one or more characteristics thereof or her association with a certain group peers. Optionally, the authentication module 156 allows a peer to access a certain section according to characteristics of her requesting terminal 5. For example, the access is granted only if the requesting terminal 5 is manufactured or marketed by a certain manufacturer or distributor.

Optionally, the mobile hosting terminal 1 hosts a peer authorization module 157 that allows the user 10 to define one or more groups of peers. Optionally, each group is defined in a list of peers who are allowed to or denied access one or more sections or segments in of the hosted mobile Blog that is stored in the repository 2 or allowed to or denied upload messages or content to the memory of the mobile hosting terminal 1. In such an embodiment, when the P2P connection 7 is established, the mobile hosting terminal 1 identifies the peer that uses the requesting terminal 5, and the peer authorization module 157 determines whether the peer is in one of the groups or not. Optionally, the user 10 the peer authorization module 157 defines one or more of the following groups: a group of subscribers to her mobile Blog, a group of friends, a group that is based on the members of the contact list, etc. Preferably, one or more of the groups are groups of social network peers, which are associated with the user 10.

Optionally, the peer authorization module 157 defines an accessed peers group that includes all the peers that have accessed the mobile Blog. In such an embodiment, a peer that uses the requesting terminal 5 for accessing the shared updated journal via the P2P connection 7 is requested to provide an address or an ID, such as a phone number of a mobile internet protocol (IP) address. Optionally, the user is requested by a message that triggers the popping-up of a graphical UI (GUI) on the screen of the requesting terminal 5. Optionally, the GUI is presented before access to the shared updated journal is grated to the peer. In such a manner, the accessed peers group includes IDs or addresses of all the peers that ever accessed the mobile Blog via a P2P connection, as shown at 7.

Optionally, each record of each group comprises or associated with a personal identification number (PIN) or another ID of a peer. The records are matched with the PIN and/or ID of the requesting mobile device 5 and the access privileges to sections of the shared updated journal are determined according to the access privileges of the matched group. Optionally, different access rights are defined for each one of the members in each one of the groups. Preferably, one or more of the groups are groups of peers of a certain social network, which are associated with the user 10. For example, the user 10 may use the peer authorization module 157 for defining a group of friends, which are allowed to access a private mobile Blog and a group of colleagues, which are allowed to access a business mobile Blog.

Optionally, the peer authorization module 157 is designed to display a UI, such as a GUI on the screen of the mobile hosting terminal 1 that allows the user to define and update the data records of the aforementioned groups and the access privileges of the members thereof. Optionally, the GUI allows the user to select graphically sections in the mobile Blog that the peer may have access thereto. Optionally, the GUI has a text box that allows the user to enter IDs and addresses of new group members. Optionally, the peer authorization module 157 displays a UI that requests from the user 10 to approve or to decline the aforementioned request. Optionally, such a UI is popped-up whenever a new peer, who is not documented on one of the aforementioned group, requests access.

Optionally, the peer authorization module 157 is designed to define groups of users dynamically according to one or more rules, such as a location rule or a time-based rule. For example, the user 10 may define a rule that a group of peers may access one section of the mobile Blog that includes personal information about her at nighttime while the same group of peers may have access only to another section that includes only business information, such as professional articles or tips, at the daytime.

Optionally, mobile hosting terminal 1 hosts a version control unit 158. As further described above, the shared updated journal is designed to be accessed or downloaded by a requesting terminal 5, such as a cellular phone. In order to allow different cellular phones to display the shared updated journal in an optimal manner, the shared updated journal may have to be adjusted according to the version and/or the type of the requesting terminal 5. Optionally, the version control unit 158 generates a number of replicas of the shared updated journal. Each replica is adjusted to according to the specification of a different set of possible requesting terminals. Optionally, the replicas are generated automatically every period. In one embodiment, each replica comprises a representation of the shared updated journal in a different resolution. In one embodiment, each replica comprises a representation of the shared updated journal that is adjusted to a different type of a requesting terminal.

In use, the version control unit 158 identifies the version of the requesting terminal 5 and determines accordingly which version replica to provide thereto. One skilled in the art will appreciate that the version of the requesting terminal 5 may be exposed through methods, such as a GetVersion function or made available through programming means such as a variable, an attribute, etc.

As described above, the mobile hosting terminal 1 allows one or more peers to use a requesting terminal, such as a mobile phone as shown at 5, to access the media content information, such as the shared updated journal that is stored on the repository 2. Optionally, the P2P connection 7 is based on IP for mobile phones. As specified by the Internet Engineering Task Force (IETF), the reference network architecture is based on access domains, representing different sub networks, managed by the Mobile IP protocol, see C. Perkins. "IP Mobility Support". IETF, RFC 2002, Ottobre 1996, and —Carli, Neri, Mobile IP and Cellular IP Integration for Inter Access . . . , Picci (2001), which are incorporated herein by reference. Such architecture is based on the concept that most of the mobility can be managed locally within one domain without loading the core network, see Charles Perkins, David B. Johnson, "Route Optimization in Mobile IP". IETF Draft. Draft-ietfmobileip-optim-09, 15 Feb. 2000; Claude Castelluccia. "A Hierarchical Mobile IPv6 Proposal", Technical Report, INRIA, November 1998; Charles E Perkins, Kuang-Yeh Wang, "Optimized Smooth Handoffs in Mobile IP", Proceedings. IEEEInternational Symposium on Computers and Communications, 1999, pp. 340-346, 1999; C. Perkins. "Mobile IP", IEEE Communications Magazine, Volume: 35 Issue: 5, May 1997 Page(s): 84-99; Inge Gronback. "Cellular and Mobile IP: overview and enhancements", Project I Paper, March 1999 http://pi.nta.no/users/inge/cellular.pdf, A. T. Campbell, S. Kim, J. Gomez, C-Y. Wan, which are incorporated herein by reference. Optionally, a Mobile IP (MIP) protocol is used as an inter-subnet mobility protocol for macro-mobility management; while Cellular IP (CIP) is employed for the intra subnet mobility as support to the micro-mobility and paging management.

Reference is now made to and FIG. 4 and FIGS. 5 and 6, which are exemplary schematic illustrations of a screen 406 of the requesting terminal 5, according to one embodiment of the present invention. As described above, the requesting terminal 5 may be a cellular phone. In order to establish such a P2P connection, as described above, the user of the requesting terminal 5 has to specify the IP mobile address of the mobile hosting terminal 1. As commonly known, not all the cellular network provides a fixed IP address to their subscribers. Therefore, a process that allow the establishment of a P2P connection may include acquiring the current IP address of the hosting mobile terminal 1. Usually, the acquiring of the current IP address is based on a respective phone number.

As further described below, the phone number of the hosting mobile terminal 1 is known from the address book of the requesting mobile terminal or from a search.

As commonly known, each record in the contact list 401 of the requesting terminal 5 is associated with a contact name 402 and a related call identifier, such as a telephone number (not shown), and optionally an IP mobile address (not shown). After the user designates a contact name 402 from the contact list 401, she may choose how to communicate therewith. Optionally, the user may choose to access the Blog of the designated contact name 405. Optionally, after the user designates the contact name 402, a GUI 408 that allows her to choose to access the Blog of the related person 407 appears on the screen 406. In such an embodiment, a process for acquiring the IP mobile address of the mobile hosting terminal 1 of the contact, which is associated with the chosen contact name 402, is used initiated. After the requested mobile address is acquired, a P2P connection with the mobile hosting terminal 1 is established, as described above. In such a manner, the user may access the shared mobile information of one of her contacts without knowing the IP mobile address of his mobile Blog.

In one embodiment of the present invention, the IP mobile address is acquired using a yellow pages operator server that functions as a domain name service (DNS) or using a public enum directory of telephone numbers, such as e164.org, which is available in URL http://www.e164.org/, which the content thereof is incorporated herein by reference. When the user of the requesting terminal 5 wants to access a mobile Blog that is hosted in a certain mobile hosting terminal, the requesting terminal 5 forwards an identifier, such as a phone number, that uniquely indicates the network termination point thereof to the yellow pages operator server. The yellow pages operator server translates the number, e.g. 09173094502 into the related IP mobile address that a networking equipment needs for establishing the P2P connection, as described above.

In one embodiment of the present invention, the IP mobile address is acquired by sending a message, for example through an SMS or the like. Optionally, such a message includes the IP mobile address of the requesting terminal. When the mobile hosting terminal receives the particular message with the IP address of the requesting terminal, it initiates a P2P connection therewith. Alternatively, the mobile hosting terminal may send an acknowledgment, with information that includes its IP, to the requesting terminal. In particular, the requesting terminal issues a request SMS to the number of the hosting mobile device. Such a request SMS is tagged to be differentiated from regular SMSs. The content of the request SMS is baring the IP address of the requesting terminal that wants to connect. Optionally, the hosting mobile device detects the request SMS, decodes from the body of the message the mobile IP address of the requesting terminal and port information thereof, and initiates a transmission control protocol (TCP)/IP session with the requesting terminal. Optionally, the hosting mobile device detects the request SMS, decodes the IP address of the requesting terminal and the port information thereof, and sends a reply SMS with its IP address and port. The requesting terminal receives the SMS and uses it for establishing the P2P connection 7.

In one embodiment of the present invention, the phone number of the mobile hosting terminal is translated to an IP mobile address using a cellular operator service. In such an embodiment, the operator assigns the IP mobile address to the mobile terminal, for example, according to third generation partnership project (3GPP) standard that is incorporated herein by reference. The standard specifies the address resection process that is implemented by a 3G operator, optionally using the home subscriber server (HSS) that stores information about the requesting and mobile hosting terminals.

Figure 7:
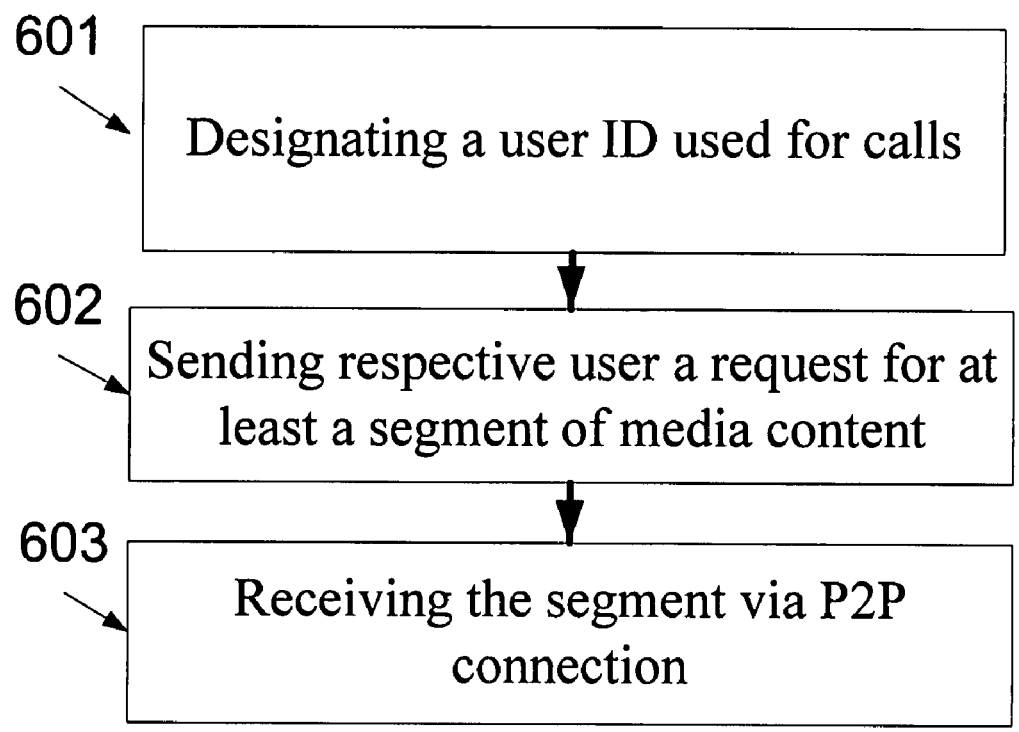
FIG. 7 is a flowchart of a method for acquiring media content information, such as the shared updated journal, via a P2P connection established over a cellular network, according to one embodiment of the present invention.

Reference is now made to FIG. 7, which is a flowchart of a method for acquiring media content information, such as the shared updated journal, via a P2P connection established over a cellular network, according to one embodiment of the present invention. During the first step, as shown at 601 a member of a plurality of user identifications (IDs), such as a contact list is designated, preferably as described above. The user IDs are also used for establishing a communication connection, such as a phone call or a voice over IP (VoIP) call, with a respective user. Then, as shown at 602, a request for receiving the media content information is sent to the respective user. Optionally, as described above, the request is sent to an IP mobile address that is associated with the user ID. During the following step, as shown at 603, one or more segments of the media content information are acquired from the mobile terminal that is associated with the user ID via the peer-to-peer connection.

Figure 8:
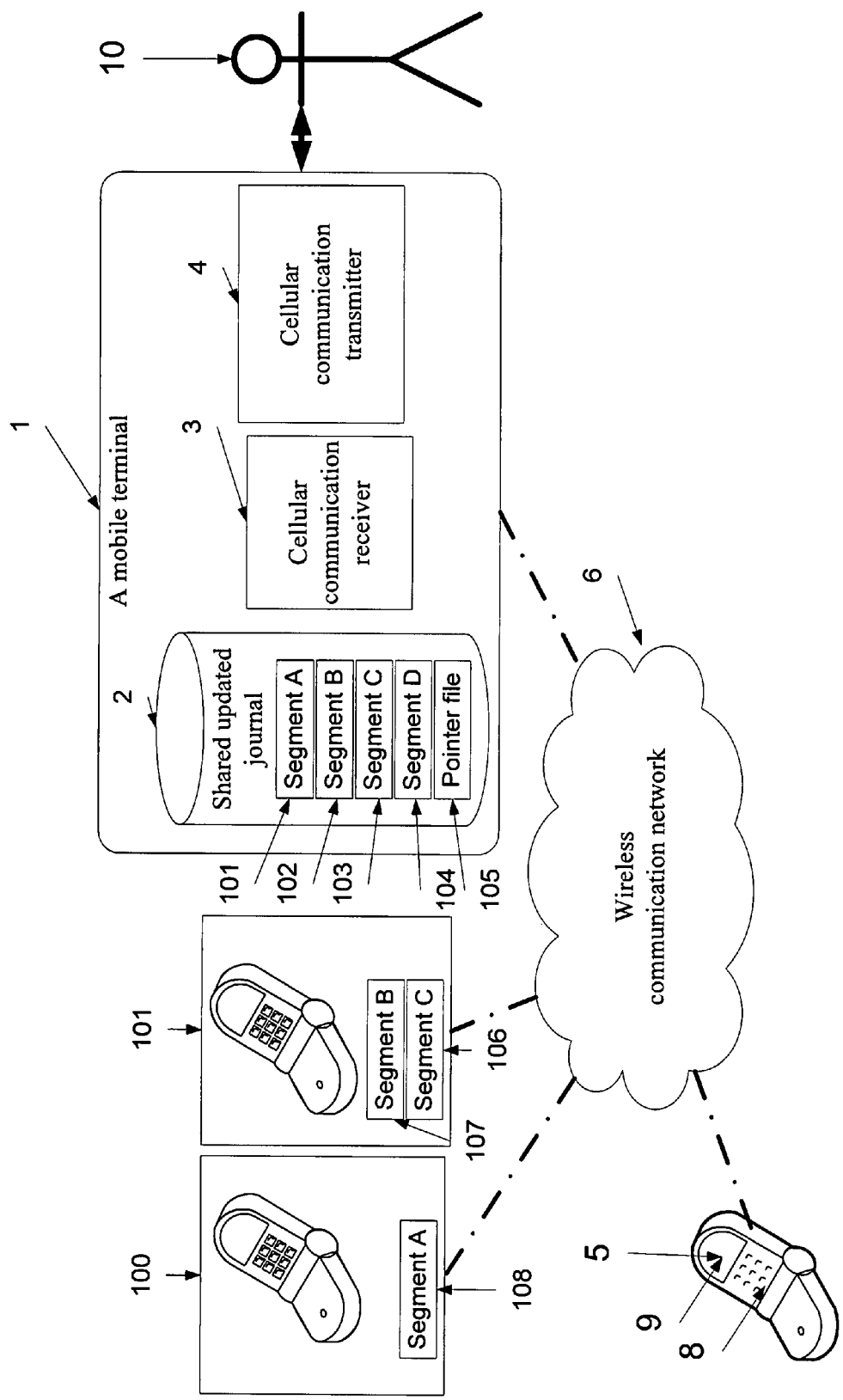
FIG. 8 is a schematic illustration of a number of requesting terminals and the mobile hosting terminal of FIG. 1, according to one embodiment of the present invention.

Reference is now made to FIG. 8, which is a schematic illustration of a number of requesting terminals 5, 100, and 101 and the mobile hosting terminal 1, according to one embodiment of the present invention. The mobile terminals 1, 5, 100, and 101 are as defined in FIG. 1. However, FIG. 8 further depict a distributed peer-to-peer mechanism that allows distributing the shared updated journal among a number of mobile terminals, dispersing all the costs of the needed hardware, hosting, and bandwidth resources from the original distributor, which is the mobile hosting terminal 1, to a number of related mobile terminals. In such an embodiment, the requesting terminal may send the request to mobile terminals that stores segments of the shared updated journal or replicas of the segments of the shared updated journal.

In particular, the mobile hosting terminal includes the shared updated journal comprises a webpage, such as a mobile Blog, as described above. Optionally, the mobile Blog is a HTML page or any other page that uses tags or pointers for locating multimedia content objects, such as images, videos, or graphics. In such an embodiment, the shared updated journal may be segmented to segments A-D, as shown at 101-104, where each segment includes one or more images, videos or graphics. Optionally, the HTML page is hosted in the repository and the segments are distributed over a number of mobile terminals, as described below. Usually, the size of the HTML page is substantially smaller than the size of the multimedia content objects. For example, a standard mobile Blog with seven images and graphics comprises an HTML page with a size of approximately 3,000 bytes and pointers to 6MB of multimedia content objects.

In order to minimize the bandwidth that is needed to provide the segments 101-104 to a requesting terminal 5, a number of additional replicas of one or more of the segments 101-104 have to be available over the wireless communication network 6. Optionally, a group of mobile terminals, which are connected to the wireless communication network 6, implements a P2P file sharing communications protocol, such as BitTorrent protocol, which the specification thereof is available in the URLs http://www.bittorrent.org and in http://wiki.theory.org/BitTorrent-Specification, which the disclosures thereof are incorporated herein by reference.

As the requesting terminal 5 may acquire the segments 101-103 from replicas 106-108, less bandwidth and computational complexity are needed from the mobile hosting terminal in order to allow the requesting terminal 5 to acquire the shared updated journal. In such a manner, other requesting terminals may simultaneously acquire the shared updated journal.

Optionally, in order to distribute the replicas of the segments, the mobile hosting terminal 1 first creates a pointer file 105 that contains metadata about the segments to be shared 101-104, their replicas 106-108, and about their distribution.

Optionally, the segments are defined as or converted to metainfo files. Optionally, a conversion to metainfo files is performed by activating a maketorrent application by another program that creates a torrent file according to the metainfo format. The file format is simple and well documented, inter alia, in the URL: http://wiki.theory.org/BitTorrentSpecification#Metainfo_File_Structure, which the content thereof is incorporated herein by reference. In such an embodiment, the HTML page is updated or defined to points to torrent files instead of to the multimedia files. Such a conversion creates a .torrent metainfo file for each file referred by the HTML file.

For example, a .torrent metainfo file is created for each file referred by an HTML page, which may be referred to as the exemplary HTML page, defined by the following HTML lines:

```
<!DOCTYPE html PUBLIC "-//W3C//DTD HTML 4.01 Transitional//EN">
<html>
<head>
<meta content="text/html; charset=ISO-8859-1" http-equiv="content-type">
<title>John Doe</title>
</head>
<body>
<h1>My MobileBlog</h1>
Welcom to my mobile blog<br>
This blog is dedicated to Weimaraner<br>
DOGS and their Owners<br>
<h2>Profile:</h2>
<span style="font-weight: bold;">Me:</span> Jone Doe<br>
<img style="width: 150px; height: 146px;" alt="me" src="files/eeyore3.JPG"><br>
<span style="font-weight: bold;">Age:</span> 26<br>
Interests: Dogs, Sports, Jazz, Traveling<br>
<span style="font-weight: bold;">My Message to the world:</span><br>
"Dogs are the mans best friend"<br>
<hr style="width: 100%; height: 2px;">Date: 10/04/2006<br>
Here some pictures of Wiemerunner <br>
<br>
Wiemaraner Standard Breed<br>
<img style="width: 398px; height: 299px;" src="files/Weimaraner_wb.jpg" alt=""><br>
some facts of the breed:<br>
<br>
<hr style="width: 100%; height: 2px;">Date: 17/04/2006<br>
<br>
Wiemaraner - Jumping Challenge<br>
<img style="width: 394px; height: 262px;" alt="jump" src="files/Weimaraner_agility_jump.jpg"><br>
<hr style="width: 100%; height: 2px;">Date: 24/04/2006<br>
<br>
Wiemaraner - Go Fetch.<br>
<img style="width: 398px; height: 370px;" alt="wiemi1" src="files/Blue_Weimaraner.jpg">
<hr style="width: 100%; height: 2px;">Date: 1/05/2006<br>
<br>
There is nothing like new born Pupies!!<br>
Congratulations Tylore and her dog Athena the new mother.<br>
<img style="width: 401px; height: 390px;" alt="puppies" src="files/10_25_04.jpg"><br>
<br>
<br>
<hr style="width: 100%; height: 2px;">Date: 08/05/2006<br>
<br>
Already UP and Running<br>
<img style="width: 401px; height: 378px;" alt="pupies" src="files/puppies11_08.jpg">
<hr style="width: 100%; height: 2px;">Date: 15/05/2006<br>
<br>
Here are some movies of the new born Puppies!!<br>
<ul>
<li><span style="text-decoration: underline;"><a href="files/mov00007.mpeg">Athena is feeding</a></span></li>
<li><span style="text-decoration: underline;"><a href="files/mov00008.mpeg">Puppies are always hungrey</a></span></li>
<li><span style="text-decoration: underline;"><a href="files/mov00015.mpeg">Dogs Life - The Perfect Life</a><br>
</span></li>
</ul>
<span style="text-decoration: underline;"><br>
<br>
</span>
<hr style="width: 100%; height: 2px;">Date: 22/05/2006<br>
<br>
There is nothing more compelling than a Boy and his Dog<br>
<img style="width: 252px; height: 350px;" alt="boy_and_dog" src="files/boy_and_dog.jpg"><br>
<hr style="width: 100%; height: 2px;">Date: 30/05/2006<br>
<br>
My Personal special one - Yam!<br>
<img style="width: 245px; height: 398px;" alt="yam" src="files/yam.JPG"> <br>
```

-continued

```
<br>
</body>
</html>
```

Optionally, the default implementation is that names the meta info files are the names in the original file with torrent suffix. In addition, the conversion re-writes the HTML file to point to the torrent files instead of the multi-media files. For example, the lines in the exemplary HTML page are converted to the following lines:

```
<!DOCTYPE html PUBLIC "-//W3C//DTD HTML 4.01
Transitional//EN">
<html>
<head>
<meta content="text/html; charset=ISO-8859-1"
http-equiv="content-type">
<title>John Doe</title>
</head>
<body>
<h1>My MobileBlog</h1>
Welcom to my mobile blog<br>
This blog is dedicated to Weimaraner<br>
DOGS and their Owners<br>
<h2>Profile:</h2>
<span style="font-weight: bold;">Me:</span>Jone Doe<br>
<img style="width: 150px; height: 146px;" alt="me"
src="files/eeyore3.JPG"><br>
<span style="font-weight: bold;">Age:</span> 26<br>
Interests: Dogs, Sports, Jazz, Traveling<br>
<span style="font-weight: bold;">My Message to the world:
</span><br>
"Dogs are the mans best friend"<br>
<hr style="width: 100%; height: 2px;">Date: 10/04/2006<br>
Here some pictures of Wiemerunner <br>
<br>
Wiemaraner Standard Breed<br>
<img style="width: 398px; height: 299px;"
src="files/Weimaraner_wb.jpg.torrent"
alt=""><br>
some facts of the breed:<br>
<br>
<hr style="width: 100%; height: 2px;">Date: 17/04/2006<br>
<br>
Wiemaraner - Jumping Challenge<br>
<img style="width: 394px; height: 262px;" alt="jump"
src="files/Weimaraner_agility_jump.jpg.torrent"><br>
<hr style="width: 100%; height: 2px;">Date: 24/04/2006<br>
<br>
Wiemaraner - Go Fetch.<br>
<img style="width: 398px; height: 370px;" alt="wiemi1"
src="files/Blue_Weimaraner.jpg.torrent">
<hr style="width: 100%; height: 2px;">Date: 1/05/2006<br>
<br>
There is nothing like new born Pupies!!<br>
Congratulations Tylore and her dog Athena the new mother.<br>
<img style="width: 401px; height: 390px;" alt="puppies"
src="files/10_25_04.jpg.torrent"><br>
<br>
<br>
<hr style="width: 100%; height: 2px;">Date: 08/05/2006<br>
<br>
Already UP and Running<br>
<img style="width: 401px; height: 378px;" alt="pupies"
src="files/puppies11_08.jpg.torrent">
<hr style="width: 100%; height: 2px;">Date: 15/05/2006<br>
<br>
Here are some movies of the new born Puppies!!<br>
<ul>
<li><span style="text-decoration: underline;"><a
href="files/mov00007.mpeg.torrent">Athena is feeding</a></span></li>
<li><span style="text-decoration: underline;"><a
href="files/mov00008.mpeg.torrent">Puppies are always
hungrey</a></span></li>
<li><span style="text-decoration: underline;"><a
href="files/mov00015.mpeg.torrent">Dogs Life - The
Perfect Life</a><br>
</span></li>
</ul>
<span style="text-decoration: underline;"><br>
<br>
</span>
<hr style="width: 100%; height: 2px;">Date: 22/05/2006<br>
<br>
There is nothing more compelling than a Boy and his Dog<br>
<img style="width: 252px; height: 350px;" alt="boy_and_dog"
src="files/boy_and_dog.jpg.torrent"><br>
<hr style="width: 100%; height: 2px;">Date: 30/05/2006<br>
<br>
My Personal special one - Yam!<br>
<img style="width: 245px; height: 398px;" alt="yam"
src="files/yam.jpg.torrent"> 
<br>
<br>
</body>
</html>
```

In use, a requesting terminal that wants to download the shared updated journal accesses the pointer file 105 and checks whether other replicas of the segments 101-104 are available. If not, the requesting terminal 5 downloads the segments directly from the mobile hosting terminal 1. However, if replicas of one or more the segments 101-104 are available in other mobile terminal, as shown at 101, 102, the shared updated journal may be replicated from them as well. For example, the requesting terminal 5 may download a replica of segment A from the mobile terminal 100 and replicas of segments B and C from the mobile terminal 101.

After the requesting terminal 5 has downloaded one or more of the segments, it stores them in the repository thereof. The pointer file 105 is updated according to the new replicas, which are stored in the requesting terminal 5.

Optionally, the mobile hosting terminal 1 updates the pointer file 105 according to changes, which are made to the shared updated journal. In addition, when one of the mobile terminals 5, 100, 101 deletes or changes one of the stored segment replicas, it sends a message to the mobile hosting terminal 1 that updates the pointer file accordingly.

Optionally the segments are identically sized pieces, typically between 64 kB and 1 MB each. Each segment may contain a multimedia file a portion thereof. Optionally, the mobile hosting terminal 1 creates a checksum for each segment, using a hashing algorithm, and records it in the pointer file. When a requesting terminal 5, 100, 101 receives that piece, its checksum is compared to the recorded checksum to test that it is error-free. The pointer file maintains a list of the requesting terminal 5, 100, 101 that currently store replicas of the shared updated journal. Optionally, this is implemented through the distributed hash table (DHT) method.

In such an embodiment, when shared updated journal is needed by a requesting terminal, as shown at 5, the acquisition of the shared updated journal is performed by getting segments from a number of mobile terminals, hence using less of each mobile terminal upload bandwidth.

For example, as described above, the shared updated journal may be represented in a page that uses tags or pointers to identify elements, such as a main transport object model. The page comprises instructions to the presentation layer that define how to render the segments to a visual display. Optionally, the model is comprises HTML instructions with Java script or an equivalent web client side functionality, such as SVG, XML, Shockwave™ flash (SWF) etc. This model may be templated and styled with relevant technology as a cascade style sheets (CSS) file or according to a naïve HTML template and style.

Optionally, the shared updated journal is divided between the mobile hosting terminal 1 and other mobile terminals 100, 101. In one embodiment of the present invention, a third of the shared updated journal is stored in the mobile hosting terminal 1 and two thirds are hosted in different mobile terminals 100, 101.

Optionally, the hosting mobile terminal comprises an updating mechanism that is used for updating all the distributed segments or replicas of the segments of the shared updated journal. In use, when the shared updated journal is updated, for example using the sensors of the hosting mobile terminal 1, as described above, the updating mechanism upload updates to relevant segments. Optionally, as this uploading requires resources of the hosting mobile terminal 1, such as battery power and bandwidth, the updating mechanism is activated according to predefined rules. For example, the predefined rules may activate the updating mechanism only when there is a certain minimum of battery power or when the hosting mobile terminal 1 is in a certain operational mode.

Optionally, the hosting mobile terminal comprises a distributing mechanism that creates, optionally persistently, a cache of segments on the storage of requesting mobile terminals of peers that have already downloaded the segments. Optionally, the distributing mechanism uses commands which are similar to the BitTorrent GET command or tracker hypertext transfer protocol (HTTP) GET command, for example as described in section 2 of BitTorrent Protocol Specification V 1.0, which is incorporated herein by reference. The distributing mechanism provides the requesting terminal with a list of terminals that hosts the segments of the shared updated journal.

Optionally, when a requesting mobile terminal downloads a segment, it issues a 'have' protocol message, for example as described in section 4 of the BitTorrent Protocol Specification V 1.0. Optionally, the 'have' protocol message is extended as follows:

Have: <len><id><piece index>[cached expire=date_time][peer id]

where ▯ denotes a file that is not in the BitTorrent Protocol Specification V 1.0.

Optionally, a new protocol message 'have cache' is added. The new have cache message is sent to the original tracker as follows:

---

Have Cache: <len><id><FileOrPiece flag><cache expire=date_time><hash_info><peer id>

--- where len denotes the length of the message, id denotes the ID of the message, FileOrPiece denotes a flag that indicates whether the cached is a piece or entire file, cache expire denotes a date and a time in which the cache expires, hash info denotes a unique identifier of the file same as in the original metainfo file torrent, and peer id denotes a phone number associated with the requesting mobile terminal that caches the segment.

Optionally, a <have cache> message is sent to the original Tracker via an SMS or alternative transport with the same contents of the have cache message, but sent through an alternative transport.

The distributing mechanism receives commands indicating the cache by one or more requesting mobile terminals.

The distributing mechanism maintains a table named 'cache peers' for each hash_info. Optionally, the table is a list of peer IDs that informed of caching a certain file. When a request for the certain file is issued though the Tracker http GET command, the distributing mechanism queries the 'cache peers' table. In one embodiment, the aforementioned yellow pages operator server or the like is used for translating the phone numbers in the table to IP addresses and return a list of IP addresses. Such an embodiment allows the distribution of load among a number of terminals.

In one embodiment of the present invention, the segmented are distributed among a plurality of mobile terminals in the network 6 and indexed as described in U.S. patent application Ser. No. 11/703,758, filed on Feb. 8, 2007, which is incorporated herein by reference. In such an embodiment, the pointers or the IDs of segments, which are stored in the pointer file 105, are distributed in a number of indexes stored in different mobile terminals. Each mobile terminal hosts the segments, which are documented in its index. Optionally, pointers or the like connects the indexes to one another. Optionally, a limit is imposed on a size parameter of the index and therefore on the number of segments that each mobile terminal hosts. In an exemplary embodiment of the invention, the limit is a total size of the index. Generally, when a requesting terminal 5 accesses the shared updated journal, it receives a pointer or ID to one or more segments and searches it in the indexes. For each segment, the requesting terminal 5 searches the connected indexes until the requested segment is found. This process is repeated until all the segments of the shared updated journal are acquired.

Figure 9:
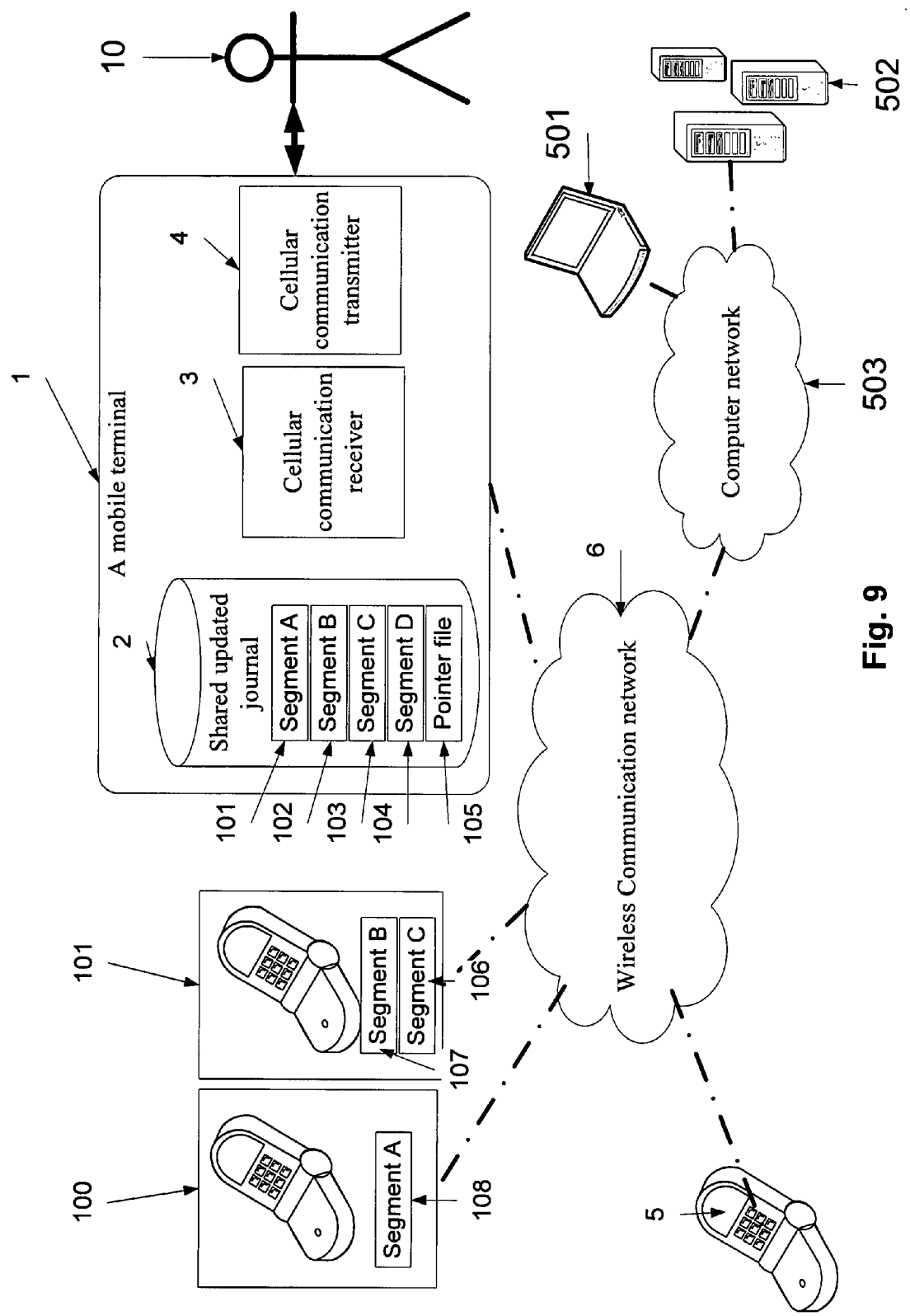
FIG. 9 is a schematic illustration of the requesting terminals and the mobile hosting terminal, as depicted in FIG. 8 and a server and a personal computer, which are connected to computer network, such as the Internet, according to one embodiment of the present invention.

Reference is now made to FIG. 9, which is a schematic illustration of the requesting terminals 5, 100, and 101 and the mobile hosting terminal 1, as depicted in FIG. 8 and a server 501 and a personal computer 502, which are connected to computer network 503, such as the Internet, according to one embodiment of the present invention. As described above, replicas of segments of the shared updated journal that is stored in the repository 2 of the hosting mobile device 1 may be distributed among a number of mobile terminals. Optionally, the replicas of segments are distributed also among computer network nodes, which are connected to a computer network, such as the Internet that is connected to the wireless communication network 6. In such an embodiment, the pointer file 105 may comprise IP addresses of the server 501 and the personal computer 502. Optionally, a replica of all the segments 101-104 of the shared updated journal is stored on the server 501 or the personal computer 502. Such a replica may be used as a backup of the mobile Blog or as an additional source for users from which they can access the shared updated journal.

Optionally, the hosting mobile device 1 comprises an updating module, as shown at element 152 of FIG. 3, that updates the replicas of all the segments 101-104 to include the changes made to the shared updated journal that is stored in the repository 2 and optionally, vice versa. In such a manner, the user 10 may have two versions of his Blog, one hosted in repository 2 and the other on the server 502. For example, the shared updated journal, which is stored in the repository 2, may be updated according to a webspace, such as a webpage, a social network profile, or a Blog that is stored in a network node, such as a MySpace™ server or other social networking system and optionally, vice versa. In use, the hosting mobile device 1 establishes the P2P connection 7 or another communication link, such as a Wi-Fi connection or, accesses the replica's server according to a predefined URL, and updates the replica or the shared information according to predefined criteria, such as last modified timestamp or last indexed time.

It is expected that during the life of this patent many relevant devices and systems will be developed and the scope of the terms herein, particularly of the terms a mobile terminal, a controller, a computing unit, and a communication network are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A mobile hosting terminal, comprising:
   an editing module configured for allowing a user associated with a user identification (ID) to edit a related personal user content stored in a repository of a mobile terminal, said personal user content being divided to a plurality of segments;
   a memory which stores a plurality of links to said plurality of segments;
   an updating mechanism which detects an editing of said personal user content by said editing module and uses at least some of said plurality of links to update at least some of said plurality of segments according to editing of said personal user content by said editing module;
   a server module configured for receiving a request for said personal user content from a requesting terminal and providing at least some of said plurality of links over a wireless communication network to said requesting terminal which uses said at least some of said plurality of links to acquire said personal user content and to present said personal user content in response to a selection of said user ID on said requesting terminal; and
   wherein said plurality of links link to said plurality of segments being stored in a plurality of mobile hosting terminals.

2. The mobile hosting terminal of claim 1, wherein said personal user content is a member of a group comprising: a shared updated journal, a user uploaded media content, a web log, and a photo album.

3. The mobile hosting terminal of claim 1, wherein said mobile hosting terminal is a cellular phone.

4. The mobile hosting terminal of claim 1, wherein said server module is configured for transmitting a request for a second content from a remote terminal, and for receiving said second content over said wireless communication network.

5. The mobile hosting terminal of claim 1, further comprising a user interface (UI) configured for allowing said user of to edit said personal user content.

6. The mobile hosting terminal of claim 1, further comprising a user presence module configured for estimating the availability of said user and to add said estimation to said personal user content.

7. The mobile hosting terminal of claim 6, wherein said estimating is determined according to the operative mode of the mobile hosting terminal.

8. The mobile hosting terminal of claim 1, wherein said server module is further configured for receiving a message from said requesting terminal via said wireless communication network.

9. The mobile hosting terminal of claim 8, further comprising a messaging module configured for storing said message in said repository.

10. The mobile hosting terminal of claim 8, wherein said editing module is configured for changing said personal user content according to said message.

11. The mobile hosting terminal of claim 10, wherein said message comprising a member of the following group: a video, an audio, a document, and a remark loaded by said user.

12. The mobile hosting terminal of claim 1, wherein said requesting terminal is associated with a user identifier of a peer.

13. The mobile hosting terminal of claim 12, wherein said editing module is configured for updating the personal user content according to said user ID.

14. The mobile hosting terminal of claim 12, further comprising an authentication module configured for identifying access privileges of a peer using said requesting terminal according to said user identifier, said providing being determined according to said access privileges.

15. The mobile hosting terminal of claim 14, further comprising a peer authorization module configured defining access privileges of a group of peers, said providing being determined according to a relation said peer to said group of peers.

16. The mobile hosting terminal of claim 1, wherein said editing module comprises a version control unit configured for adjusting the personal user content according to the capabilities of said requesting terminal.

17. The mobile hosting terminal of claim 1, wherein each said segment comprises at least a portion of a multimedia content file.

18. The mobile hosting terminal of claim 1, wherein said requesting terminal is configured for acquiring at least one of said plurality of segments from at least one of said plurality of mobile hosting terminals according to said plurality of links.

19. The mobile hosting terminal of claim 1, wherein said requesting terminal stores at least one replica of at least one of said segments, said plurality of links being updated according to said at least one replica.

20. The mobile hosting terminal of claim 1, wherein the wireless communication network is connected to the Internet, said plurality of links containing at least one link to a second replica of the first content, said second replica stored in a fixed hosting terminal connected to the Internet.

21. The mobile hosting terminal of claim 1, wherein said editing module allows said user to edit only part of said personal user content stored and said updating mechanism respectively updates only part of said plurality of segments.

22. The mobile hosting terminal of claim 1, wherein said personal user content is shared by said user and a plurality of additional users and said plurality of segments are updated according to inputs from a plurality of additional users which are received by a plurality of additional editing modules installed on at least some of said plurality of mobile hosting terminals.

23. The mobile hosting terminal of claim 1, wherein said segments are dynamically adjusted segments.

24. The mobile hosting terminal of claim 1, wherein said selection is made from a list of a plurality of user IDs presented on said requesting terminal.

25. A method of managing locally hosted personal user content, comprising:

storing a related personal user content in a repository of a mobile terminal, said personal user content being divided to a plurality of segments which are stored in a plurality of mobile hosting terminals;

storing a plurality of links to said plurality of segments in said repository;

editing said related personal user content according to instructions received on said mobile terminal;

in response to said editing, updating at least some of said plurality of segments in said plurality of mobile hosting terminals according to instructions received on said mobile terminal from a user associated with a user identification (ID) and using at least some of said plurality of links;

receiving a request for said personal user content from a requesting terminal;

providing at least some of said plurality of links over a wireless communication network to said requesting terminal which uses said at least some of said plurality of links to acquire said personal user content and to present said personal user content in response to a selection of said user ID on said requesting terminal.

\* \* \* \* \*